Patented May 9, 1944

2,348,637

UNITED STATES PATENT OFFICE 2,348,637

ALKYLATION WITH OLEFIN MIXTURES

Richard N. Meinert, Westfield, N. J., assignor to Standard Oil Development Company, a corporation of Delaware No Drawing. Application July 16, 1940, Serial No. 345,862

8 Claims. (Cl. 260—683.4)

This application is a continuation in part of an application, Serial No. 311,471, filed December 29, 1939, which is in turn a continuation in part of an application, Serial No. 277,258, filed June 3, 1939.

The present invention relates to a process for producing normally liquid, saturated hydrocarbons suitable for use as motor fuels and boiling within the gasoline boiling range by alkylating isoparaffins or other saturated hydrocarbons containing at least one tertiary carbon atom per molecule with monoolefins and in particular with specific types of mixtures of monoolefins such as, for example, ethylene and propylene mixtures, to produce the desired final products.

The aforementioned applications disclose the carrying out of such reactions with a novel alkylation catalyst. It has previously been found that markedly increased yields of alkylation products having the desired motor fuel boiling range may be produced when a substantially saturated aqueous solution of boron trifluoride is employed as the alkylation catalyst. The exact nature of this catalyst is not known since according to "Modern Inorganic Chemistry," by J. W. Mellor, several compounds are formed when $BF_3$ is added to water. One reaction consists in the hydrolysis of part of the $BF_3$ to produce boric acid and $HF$. The $HF$ liberated reacts with unhydrolyzed $BF_3$ to give $HBF_4$. In addition, $BF_3$ is known to form hydrates with water. It is possible that the actual active catalyst may be one of the above compounds or some compounds which have not been identified as yet. It is also possible that the catalyst is a solution of $BF_3$ in $HBF_4$. It is to be distinctly understood that the process of the present invention is not limited to any theory of the reaction and that the claims appended hereto are not to be limited in the light of the above described theory. In effecting the process of the present invention, it is only necessary that the catalyst be composed of water substantially completely saturated with boron trifluoride.

In making up the catalyst for use in the invention, water maintained at room temperature has bubbled therein boron fluoride until there is no further change in weight of the solution. The precipitate, which is probably boric acid, is filtered from the solution and the solution is then ready for use in the alkylation reaction. Where the catalyst is prepared at temperatures substantially below room temperature, for example at 40° F., and where the subsequent alkylation reaction is carried out at substantially the same temperature, the precipitate above mentioned does not appear and there is no need for filtering the catalyst solution prior to its introduction in the alkylation reaction.

It is an object of the present invention to alkylate isoparaffins with monoolefinic mixtures in the presence of substantially saturated aqueous solutions of boron trifluoride to produce normally liquid, saturated hydrocarbons suitable for use as motor fuels or as blending agents in motor fuels.

It is an object of the present invention to produce improved yields of motor fuels substantially completely saturated in character and boiling within the gasoline range without sacrificing to any great extent the octane number which may be obtained by alkylating fairly narrow olefinic cuts as heretofore practiced in connection with saturated aqueous solutions of boron fluoride.

It is a further object of the present invention to alkylate the isoparaffins, as, for example, isobutane and/or isopentane, with olefinic mixtures containing ethylene, as, for example, olefinic mixtures of ethylene and propylene, in order to produce improved yields of motor fuels boiling within the gasoline boiling range and having high octane numbers.

Other objects will be apparent to those skilled in the art upon a further understanding of the following disclosure.

The temperature for carrying out the reaction is usually maintained between about 35° F. and about 80° F., although temperatures outside of this range, as, for example, temperatures lying between 35° F. and 110° F., may be desirably employed under certain conditions. The time of reaction may vary between about 5 minutes and about 3½ hours depending upon the other reaction conditions maintained. It is ordinarily desirable to use reaction times of between about 10 and about 60 minutes except in cases where ethylene is present in extremely large amounts with reference to the other olefins present, in which case longer times, say up to 120 minutes, may be desirable.

It is preferred to carry out the reaction in the liquid phase, and where the higher temperatures are employed the use of superatmospheric pressure is necessary to maintain this liquid phase operation. Pressures up to 100 atmospheres gauge are ordinarily sufficient to accomplish this result. It is contemplated to carry the reaction out, however, in either the liquid or vapor phase.

Under some of the conditions above mentioned it may be desirable to maintain a substantial excess of hydrocarbon reactant containing at least one tertiary carbon atom per molecule in the reaction zone and to operate in a reaction medium containing an excess of the catalyst. Where isobutane or isopentane are employed as the isoparaffinic reactants, the molar excess may range from 1 to 10 or even as high as 30 mols per mol of total olefinic content of the reaction mixture. Equal molar quantities of isoparaffins and total olefinic content are, however, contemplated and appear to be desirable in many instances. However, where ethylene-propylene mixtures are employed the increase in isoparaffin to total olefin mol ratio from 1:1 to at least 5:1 would appreciably increase the yield of total alkylate but would not seem to effect any substantial change in octane number of the product.

Any suitable apparatus which has heretofore been employed for polymerization or alkylation processes may be employed for carrying out the process of the present invention. Unreacted reactants as well as higher boiling reaction products may be separated from the final product based upon the fresh monoolefins and fresh isoparaffins added to the alkylation unit.

As before indicated, any isoparaffin or any saturated hydrocarbon containing at least one tertiary carbon atom per molecule may be employed either alone or in admixture with one or more of its homologues as one portion of the reactants in the present invention. It is particularly desirable from a commercial standpoint to employ isobutane and/or isopentane as the paraffinic component of the charging stock. It is understood, however, that the isohexanes and heptanes may in certain instances be desirable feed stocks in carrying out the present invention.

As the olefinic reactants, it is essential in order to take advantage of the present invention to employ mixtures of olefinic reactants. At least one of these olefins should be ethylene. Thus the process of the present invention contemplates the use of such binary olefinic mixtures as ethylene-propylene, ethylene-normal butylenes, ethylene-isobutylene, and the like. It is not necessary that the olefinic component of the feed stock be exclusively composed of two olefins. In other words, it is within the purview of the present invention to employ olefinic mixtures which predominate in two olefinic components, one of which is ethylene, but which may also contain small amounts of other olefins. Such a mixture could be produced, for example, by cracking stabilizer gas. This is a very desirable source of $C_2$ and $C_3$ monoolefins.

The molar ratio of ethylene with respect to the other olefin present in the olefinic mixture may vary considerably. Thus, for example, the ratio of ethylene to propylene or of ethylene to butylenes may vary between about 3:1 and about 1:2. It is to be distinctly understood, however, that in those instances in which the olefinic component of the feed predominates in ethylene that the other olefin present therein is present in such amounts that it is not to be considered that the second olefin serves only as a promoter for effecting the alkylation of ethylene. The amounts of the second olefin such as, for example, propylene, are actually sufficiently large to account for material yields of propylene alkylate in the product. The preferred ethylene to other olefin ratio lies within the range of between about 2:1 and about 0.75:1.

The process can be carried out either as a batch or continuous type of operation. It is preferred, however, to carry the same out continuously from an economic standpoint. It has been found in the present process as in previous alkylation processes that the more intimate the contact between the feed stock and the catalyst, the better the yield of saturated product obtained. In the case of batch operations, mechanical stirrers or shakers are adequate. In continuous operations, turbo mixers, jets of restricted internal diameter, porous thimbles and the like provide ample agitation of the reaction mass. In a continuous process, boron fluoride may be admixed in small amounts with the feed stock in order to maintain the concentrated boron fluoride-water mixture substantially completely saturated throughout the life of the catalyst, or the boron fluoride may be added in small amounts directly to the catalyst solution to accomplish the same ends. As previously stated, it is advisable in some instances, in order to secure excellent yields and rapid reaction rates, to carry the alkylation under superatmospheric pressures sufficient to maintain the hydrocarbon reactants in the liquid phase. In addition, this procedure is advantageous in that upon introducing small amounts of $BF_3$ into the reaction, substantially larger amounts of $BF_3$ are retained in the liquid reaction mixture. In other words, a supersaturated solution of $BF_3$ in water is obtained due to the increased pressure within the reactor.

As the following examples will show, it has been found to be a distinct advantage to be able to alkylate mixtures of ethylene and propylene directly rather than to alkylate ethylene in one unit and propylene in another and then to combine the alkylates from the two products. One advantage lies in the fact that it becomes unnecessary when practicing the present invention to attempt to effectively separate ethylene from propylene in a $C_2$—$C_3$ fraction of a cracked stabilizer overhead. This work results in a marked reduction in the cost of operating such an alkylation unit. The examples are intended to be illustrative of the inveniton disclosed herein and are not to be considered as in any way limiting the scope of the appended claims.

*Example 1*

A mixture of isobutane and saturated aqueous solution of boron fluoride were introduced into an autoclave maintained under a pressure of between about 50 and about 100 pounds per square inch and at a temperature of about 70° F. A commercial mixture of ethylene and propylene in equal molar ratio was slowly added over a period of about 40 minutes with vigorous agitation of the reaction mixture. The amount of ethylene-propylene added was such that the final mol ratio was about 5 mols of isobutane per mol of ethylene-propylene. An additional 20 minutes was allowed for completion of the reaction. The yield of product boiling above isobutane was about 205% by weight based on the total ethylene-propylene added. The product had substantially a zero bromine number. The 57–165° F. fraction amounted to 42.2% of the product. The 165–265° F. fraction amounted to 45% of the product. The A. S. T. M. octane number of the first fraction was roughly 90, whereas the A. S. T. M. octane number of the second fraction was roughly 86. In this experiment the total hydrocarbon to catalyst volumetric ratio was maintained at about 2:1.

*Example 2*

In another experiment conducted under identical reaction conditions and employing the same feed stocks, catalyst, etc., except that the total isobutane to total olefin molar ratio was maintained at about 2:1 instead of 5:1, the yield based upon the total olefin added amounted to about 209%, of which the first fraction boiling between 57–165° F. constituted 41.4% of the product and the second fraction, 165–265° F., constituted 39.6% of the product. The first fraction had an A. S. T. M. octane number of about 91.6; the section fraction about 84.7.

*Example 3*

In this experiment the conditions of the former runs as outlined in Examples 1 and 2 were duplicated, both as to reaction conditions and catalyst and reactants, except that the ethylene to propylene molar ratio in the olefinic portion of the feed was maintained at about 1.4:1 while the total isobutane to total olefin molar ratio was maintained as in Example 2. The yield amounted to about 205% by weight based on the total olefins employed, of which 48.5% constituted the 57–165° F. cut and 40.8% the 165–265° F. cut. The first cut had an octane number by the A. S. T. M. method of 91.7, while the second cut had an A. S. T. M. octane number of about 84.

*Example 4*

Under conditions comparable to Example 1, a run was made employing ethylene alone as the olefinic portion of the feed stock. There was obtained a product substantially completely saturated in character in a yield of about 225 weight per cent based on the ethylene. Of this product, 61% boiled between 57 and 165° F. and 30% between 165 and 265° F. The octane number of the first fraction by the A. S. T. M. method was 92.5, whereas the octane number of the second fraction was 82.

*Example 5*

Under conditions comparable to those set forth in Example 1, except that the ethylene-propylene olefinic feed stock was replaced by propylene alone, a product was obtained in about 205 weight % yield based on the propylene. Of this, 9–10 weight % boiled between 57 and 165° F. and 66 weight % boiled between 165 and 265° F. The first and second fractions had A. S. T. M. octane numbers of about 87.

Upon blending the first fraction of the product produced in Example 4 with the first fraction of the product produced in Example 5, the octane number by the A. S. T. M. method was found to be 92. Likewise, by blending the second fraction of each of the two preceding examples the octane number of the blend by the A. S. T. M. method was found to be 86. It will be noted that in contrast to this octane number, the octane number of the same fraction produced according to Examples 1 and 2 was almost as high as that obtained according to Examples 4 and 5. This is also true with respect to the second fractions when compared on the basis of octane number. In every case the corresponding cut with respect to using a mixed olefin feed is possibly one octane number lower than the corresponding blended cut from Examples 4 and 5 which have employed single olefins in the alkylation process.

While this does not appear at first hand to be any distinct advantage over the prior art, the outstanding advance lies in the fact that the quantities of product produced are surprisingly larger with respect to the combined olefinic feed stock in contrast to the separate alkylation of each of the olefins followed by a blending of the corresponding cuts. This is clearly brought out in the following table:

| | Type of alkylation | Olefin reactant, pounds | Product in pounds | 57–165° F. cut | | 165–265° F. cut | | 265–400° F. cut | |
|---|---|---|---|---|---|---|---|---|---|
| | | | | Pounds | O. N. | Pounds | O. N. | Pounds | O. N. |
| 1 | Ethylene | 40 | 90 | 55 | 92.5 | 27 | 82 | 8 | 78 |
| 2 | Propylene | 60 | 123 | 11 | 87 | 81 | 70 | 31 | 84 |
| 3 | Blend of 1 with 2 | 100 | 213 | 66 | 92 | 108 | 86 | 39 | 82 |
| 4 | Ethylene-propylene | 100 | 210 | 87 | 91.7 | 83 | 85 | 40 | 81 |

In the table, O. N. indicates octane number by the A. S. T. M. method. The type of alkylation is designated as ethylene, indicating that the olefinic component was solely ethylene, or propylene for an olefin solely propylene. No. 3 is a blend of the two alkylates separately prepared in No. 1 and No. 2, and No. 4 is an alkylate prepared from the mixed ethylene-propylene olefinic feed.

It is at once apparent from the above table that there is actually an advantage in alkylating the ethylene-propylene mixture (No. 4) to produce 87 weight % based on total olefin of a 57–165° F. cut having an octane number of 91.7 as compared to a 66 weight % alkylation product of the same cut having an octane number of 92 obtained when each olefin is separately alkylated with isobutane and the cuts blended. While there is a slight dropping off of the octane number for the fraction when employing a mixed olefin feed stock for the alkylation, nevertheless there is an increase of 21 weight % in the product obtained which, roughly, varies in octane number from the separate alkylations of the olefins by about $\tfrac{3}{10}$ of an octane number.

As previously pointed out, the products obtained by this method are highly useful for motor fuels per se, particularly in the field of aviation gasoline, or the products may be used as blending agents for convenient gasoline base stocks for the manufacture of gasoline of the desired characteristics for general automotive purposes.

When used in the specification and claims, the expression "substantially saturated aqueous solution of boron trifluoride" or some expression equivalent thereto is intended to cover a catalyst containing substantially only water, boron trifluoride and any product of the reaction of these two materials under the reaction conditions suitable for the alkylation reaction. As previously pointed out, the exact composition of the catalyst is unknown. Since it has been fairly well ascertained that some reaction does take place between boron trifluoride and water and that these products of this reaction may in and of themselves constitute catalysts for the alkylation reaction, it is intended that the claims so cover these compounds, whatever their chemical nature may be.

Having described the invention in full, what is desired to be secured and claimed by Letters Patent is:

1. A process for producing improved yields of motor fuels boiling within the gasoline range and having improved octane number which comprises alkylating at least one isoparaffin with a normally gaseous olefinic mixture of ethylene and at least one other monoolefin wherein the molar ratio of ethylene to other monoolefins is between about 3:1 and about 1:2, in the presence of a substantially saturated aqueous solution of boron trifluoride, under alkylation reaction conditions.

2. A process for producing improved yields of motor fuels boiling within the gasoline range and having improved octane number, which comprises alkylating isobutane with an olefinic mixture of ethylene and propylene, the olefins being in the molar ratio of between about 3:1 and about 1:2, at a temperature between about 35° F. and about 80° F. in the presence of a substantially saturated aqueous boron trifluoride solution, and intensively agitating the reaction mixture during the reaction.

3. A process as in claim 2 wherein isopentane is substituted for the isobutane.

4. A process as in claim 2 wherein the reaction is carried out continuously.

5. A process for producing improved yields of motor fuels boiling within the gasoline range and having improved octane number which comprises alkylating isobutane with an ethylene-propylene mixture, the ethylene and propylene being present in substantially equal molar amounts, at a temperature of about 70° F. for about one hour, with intensive agitation, in the presence of a substantially saturated aqueous solution of boron trifluoride and under sufficient superatmospheric pressure to maintain a substantially liquid phase reaction under the conditions obtaining.

6. A process as in claim 5 wherein the isobutane is present in substantial molar excess over the total olefinic content present in the reactor at any one time and wherein the total hydrocarbon to total catalyst volume ratio in the reactor is maintained at at least about 2:1.

7. A process for producing improved yields of motor fuels boiling within the gasoline range and having improved octane number which comprises alkylating isoparaffin with a normally gaseous monoolefinic mixture of ethylene and at least one $C_4$ monoolefin, wherein the ethylene to $C_4$ monoolefin molar ratio is between about 3:1 and about 1:2, at a temperature between about 35° F. and about 80° F. in the presence of a substantially saturated aqueous boron trifluoride solution while maintaining alkylation reaction conditions.

8. A process as in claim 7 wherein the ethylene to $C_4$ monoolefin molar ratio is between about 3:1 and about 1:2, wherein the isoparaffin is isobutane and wherein the reaction is carried out continuously, the catalyst layer separated from the hydrocarbon layer and returned to the reaction zone.

RICHARD N. MEINERT.